Dec. 16, 1969 J. D. ISRAEL 3,484,699

DIVIDING CIRCUIT WITH BINARY LOGIC SWITCH IN FEEDBACK CIRCUIT TO CHANGE DIVIDING FACTOR

Filed Jan. 6, 1967 3 Sheets-Sheet 1

INVENTOR.
JACK D. ISRAEL

BY

Sidney Magnes
AGENT

SCALE-OF-16 TO SCALE-OF-10
| COUNT | F/F $2^4$ | $2^2$ | $2^1$ | $2^0$ |
|---|---|---|---|---|
| 1 | 0 | 0 | 0 | 0 |
| 2 | 0 | 0 | 0 | 1 |
| 3 | 0 | 0 | 1 | 0 |
| 4 | 0 | 0 | 1 | 1 |
| 5 | 0 | 1 | 0 | 0 |
| 6 | 0 | 1 | 0 | 1 |
| 7 | 0 | 1 | 1 | 0 |
| 8 | 0 | 1 | 1 | 1 |
| 9 | 1 | 0 | 0 | 0 |
| 10 | 1 | 0 | 0 | 1 |
| 11 | 1 | 0 | 1 | 0 |
| 12 | 1 | 0 | 1 | 1 |
| 13 | 1 | 1 | 0 | 0 |
| 14 | 1 | 1 | 0 | 1 |
| 15 | 1 | 1 | 1 | 0 |
| 16 | 1 | 1 | 1 | 1 |
FIG. 2a
SCALE-OF-8 TO SCALE-OF-5
| COUNT | F/F $2^2$ | $2^1$ | $2^0$ |
|---|---|---|---|
| 1 | 0 | 0 | 0 |
| 2 | 0 | 0 | 1 |
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |
FIG. 2b
SCALE-OF-8 TO SCALE-OF-4
| COUNT | F/F $2^2$ | $2^1$ | $2^0$ |
|---|---|---|---|
| 1 | 0 | 0 | 0 |
| 2 | 0 | 0 | 1 |
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |
FIG. 2c
SCALE-OF-8 TO SCALE-OF-6
| COUNT | F/F $2^2$ | $2^1$ | $2^0$ |
|---|---|---|---|
| 1 | 0 | 0 | 0 |
| 2 | 0 | 0 | 1 |
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |
FIG. 2d
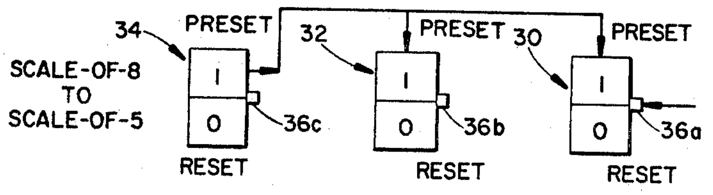
FIG. 3a
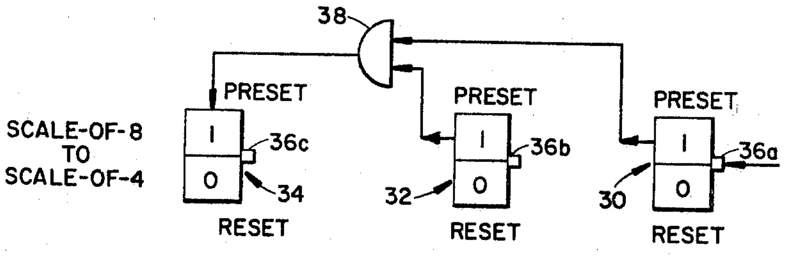
FIG. 3b
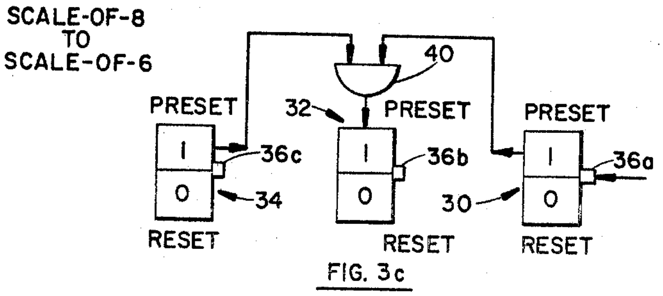
FIG. 3c
INVENTOR.
JACK D. ISRAEL
BY
Sidney Magnes
AGENT INVENTOR.
JACK D. ISRAEL
BY
Sidney Magnes
AGENT United States Patent Office 3,484,699
Patented Dec. 16, 1969

3,484,699

DIVIDING CIRCUIT WITH BINARY LOGIC SWITCH IN FEEDBACK CIRCUIT TO CHANGE DIVIDING FACTOR

Jack D. Israel, Fort Wayne, Ind., assignor to North American Rockwell Corporation, a corporation of Delaware Filed Jan. 6, 1967, Ser. No. 607,855
Int. Cl. H03k *21/00*
U.S. Cl. 328—46 7 Claims

ABSTRACT OF THE DISCLOSURE

The present invention contemplates a combination of dividing circuits having controllable feedback networks, so that—depending upon which feedback networks are operating—the dividing circuit has a selected dividing-factor. Variable dividing-rates are made possible by having specific feedback connections comprise gating circuits that may be temporarily disabled or enabled by a control-signal from an external source. In this way, a circuit may be designed to normally divide—for example—by ten; but upon the occurrence of a suitable external control signal, selected feedback connections are temporarily modified so that the modified feedback network now causes the counter to divide by nine, eleven, or by another desired number.

BACKGROUND

Figure 1:
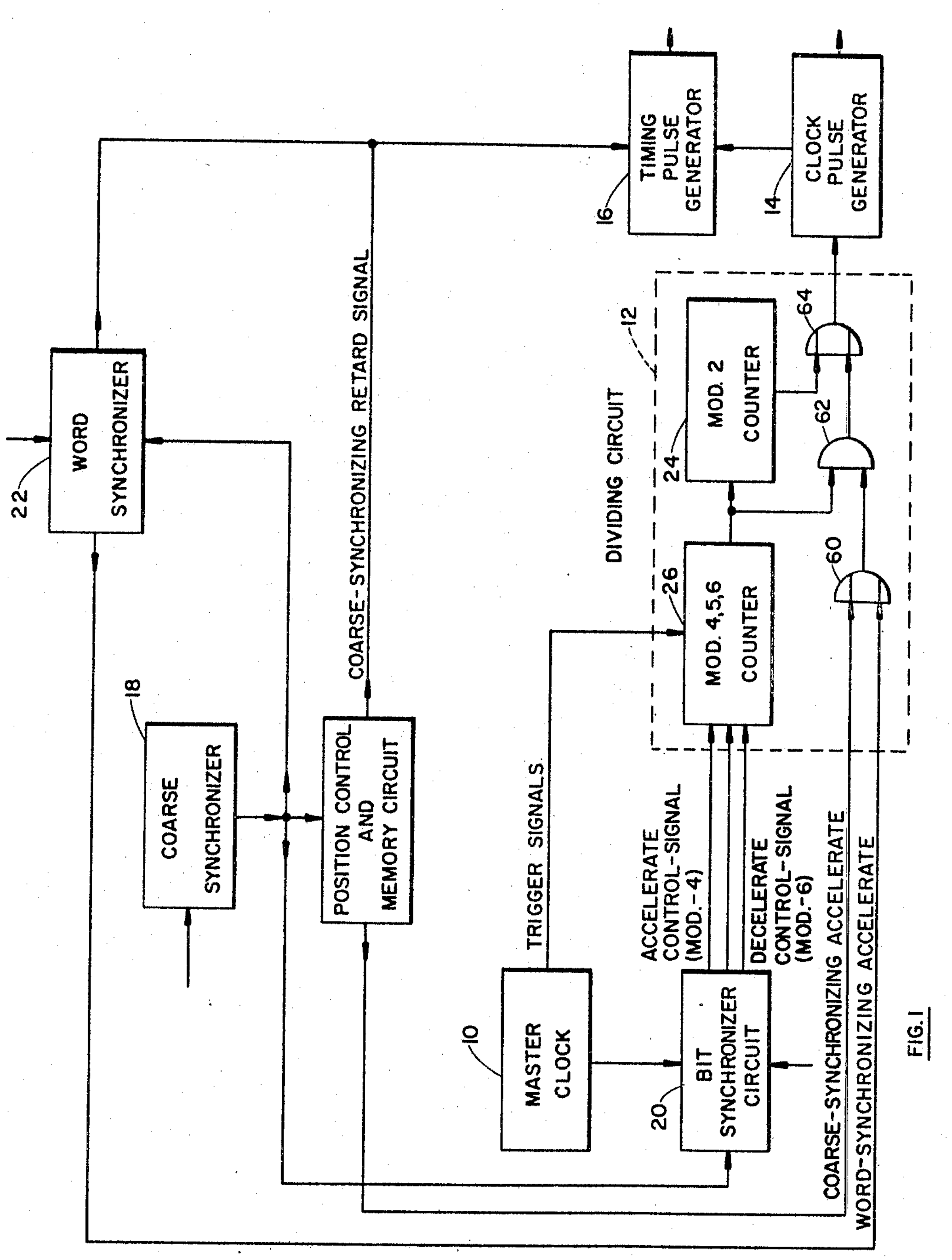

Many electronic devices require multiplying circuits, and/or dividing circuits and/or synchronizing circuits; and to achieve these results the electronic devices comprise a "timing-circuit" that provides a train of precisely timed timing-signals. The timing circuit itself generally comprises a precision oscillator, which may be thermostatically controlled to minimize the effects of temperature variations; and the output of the oscillator is then frequency-multiplied and/or frequency-divided to obtain a range of timing-signals that occur at various repetition-rates. In this way, a plurality of trains of differently-timed timing-signals is made available to all parts of the device, in order to synchronize their operations.

Frequency-multiplication is ordinarily obtained by applying the timing-signals to a circuit that is resonant to a harmonic of the input signal. In this way, the output signal has a frequency, or repetition-rate, that is higher than that of the input signal—thus producing frequency-multiplication, i.e., new timing-signals are produced more frequently than the original timing-signals.

However, for producing frequency-division, the above resonant-circuit approach is not too satisfactory. Recent frequency-division developments have tended toward the use of "binary" signals, these binary signals generally using two-level pulses; e.g., when the pulse is "off," it has one level—and when the pulse is "on" it has a second level. If this two-level (binary) pulse is applied to certain binary (two-state, bistate) circuits, such as a flip-flop or a multivibrator, one level of the pulse flips the binary-circuit to one state; and the other level of the pulse flips the binary-circuit to its other state.

Many binary-circuits are available, some of which flip only when the applied pulse is increasing in magnitude; others of which flip only when the applied pulse is decreasing in magnitude; and still others of which change state on both positive-going and negative-going input signals. Since these binary-circuits are capable of producing output signals at either or both of their states, a wide range of input-output signal relations is possible.

Binary-circuits may be used for dividing, or counting, as follows. Assume, for simplicity, that a train of pulses is applied to a particular binary-circuit that is flipped to its alternate states only when the applied pulse is increasing in magnitude; the binary-circuit producing an output signal only in its second state. Therefore, the positive-going increasing-magnitude leading-edge of a first pulse flips the binary-circuit to its first state; no output signal being produced. The negative-going decreasing-magnitude trailing-edge of this first pulse does not affect the binary-circuit.

The positive-going increasing-magnitude leading-edge of the second pulse flips the binary-circuit to its second state; producing an output signal. The negative-going decreasing-magnitude trailing-edge of the second pulse does not affect the binary circuit.

Thus, each pair of input pulses produces one output signal; or, stated in another way, the input signal is divided by two.

The above dividing, or counting, technique—and many others—are described in a number of publications, such as "Pulse and Digital Circuits," by Millman and Taub. A chapter of this book is entitled "Counting," and points out that—as indicated above—a binary device can produce one output signal for every two inputs, thus dividing by two. This chapter also teaches that two serially-connected binary devices will produce one output signal for every four input signals; and will thus divide by four—this combination being called a "Mod-4" counter, since every output signal represents four input signals. Similarly, three serially-connected binary devices form a Mod-8 counter that produces one output signal for each group of eight input signals; four serially-connected binary devices from a Mod-16 counter; etc. Thus, the usual chain of binary devices divides by two, four, eight, sixteen, etc.; i.e., divides by a factor that is a power of the number, or "base," two.

This particular chapter also teaches how serially-connected binary devices may be designed to operate on a base other than two; that is, how a divide-by-sixteen circuit can be modified to divide by ten, and how a divide-by-sixty-four circuit may be modified to divide by forty-one. The principle involved in these modifications is that of selective feedback, wherein signals from selected binary devices of a binary-chain are fed back to other binary devices of the binary-chain.

The above-cited publication thus teaches that a dividing-circuit may have a desired dividing-factor, or divisor; however, there are many cases where it is desirable for an electronic circuit to change its divisor. Ordinarily, this means that a plurality of different-divisor dividing-circuits must be constantly available, to be switched into circuitry at desired times. While this approach is completely feasible, it means that many dividing-circuits must be kept in a continuously operative—but unused—standby state for long periods of time; and this condition is undesirable from an efficiency and volumetric point of view.

OBJECTS AND DRAWINGS

It is therefore an object of the present invention to provide an improved variable dividing circuit that can provide a plurality of divisors.

Figure 4:
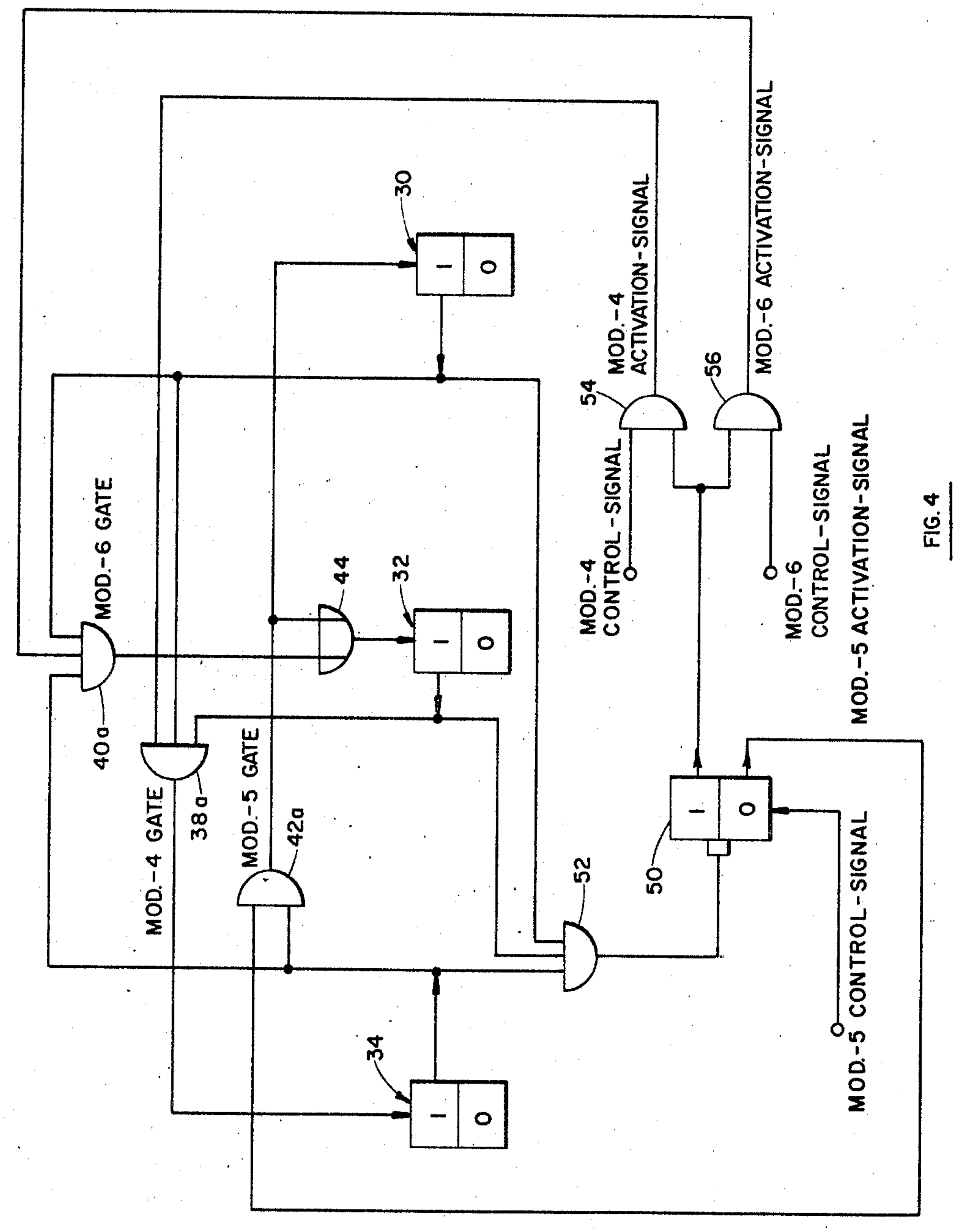

The attainment of this object and others, will be realized from the teachings of the specification, taken in conjunction with the drawings, of which FIGURE 1 shows a circuit for providing variable division;

FIGURES 2*a*–2*d* show tables for explaining the modification of dividing circuits;

FIGURES 3*a*–3*c* show divide-by-eight circuits that have feedback networks for converting them to dividing circuit having other divisors; and FIGURE 4 shows circuitry for causing a single divide-by-eight circuit to divide by other divisors, under the control of external signals.

INTRODUCTION

As indicated above, it is frequently desirable to change the dividing-rate of an electronic circuit. For example, copending patent application Ser. No. 607,854, entitled "Communication System" filed Jan. 6, 1967, and assigned to the same assignee as the instant application, shows circuitry wherein the repetition-rate of the timing-signals should have a nominal rate; but should be capable of acceleration and deceleration. Rather than using the prior-art technique of having a plural ity of separate stand-by dividing circuits, the following variable-dividing-circuit concept is used.

The present circuit operation is based on the fact that a dividing, or counting, circuit can be designed to divide by various dividing-factors; and the following explanation uses the numbers five, nine, ten, and eleven as exemplary divisors.

As discussed above, a permanent feedback network can produce a divide-by-ten or a divide-by-forty-one counter, or a counter with any desired divisor.

In FIGURE 1, high-repetition-rate trigger-signals from a master-clock 10 are to be normally divided by ten, by dividing circuit 12, so that the output of dividing circuit 12 normally drives a clock-pulse generator 14 and timing-pulse generator 16 at a given normal rate. Under certain conditions, circuits (such as coarse-synchronizing circuit 18, bit-synchronizing circuit 20, word-synchronizing circuit 22, etc., more particularly described in the above-identified copending application) cause dividing circuit 12 to change its divding-rate, so that the operation of clock-pulse generator 14 and timing-pulse generator 16 are accelerated or decelerated; and this result is accomplished as follows.

The above-discussed variable-divisor concept is used; and—as shown in FIGURE 1—dividing circuit 12 comprises a Mod-2 counter 24 connected in series with a counter 26, whose feedback connections may be modified—as will be discussed later—so that it acts as a Mod-4, a Mod-5, or a Mod-6 counter. It will be recalled from the discussion presented above, that a Mod-2 counter produces an output for every second input; a Mod-4 counter produces an output for every fourth input, a Mod-5 counter produces an output for every fifth input, and a Mod-6 counter produces an output for every sixth input. In dividing-circuit 12, counter 26 normally acts as a Mod-5 counter, that is, it produces one output for every fifth trigger-signal applied to it. Similarly, Mod-2 counter 24 produces an output for every second input-signal applied to it. In this way, the Mod-5 counter produces two output signals for every ten input signals, and the Mod-2 counter produces one output signal for every two input signals, so that the two serially-connected counters produce one output for every tenth trigger-signal input, thus forming a divide-by-ten counter; and circuit 12 normally divides by ten.

In order for dividing circuit 12 to divide by nine, an external "accelerate" control-signal is applied to counter 26 to cause counter 26 to act as a Mod-4 counter, in a manner to be discussed later, thus producing an output for the fourth trigger-signal; and this output is applied to Mod-2 counter 24. The external Mod-4 control-signal is now removed, and counter 26 now resumes its normal Mod-5 operation; and produces an output for the fifth trigger-signal—and this output is also applied to Mod-2 counter 24. Since this output is the second input applied to Mod-2 counter 24, the Mod-2 counter now produces an output. In this way, the combination dividing circuit 12 produces an output for the ninth trigger signal; that is, circuit 12 acts as a divide-by-nine counter—so that the operation of clock-pulse generator 14 is accelerated, since it is triggered at every ninth trigger-signal; rather than being triggered by every tenth trigger signal, as would occur normally.

In order for dividing circuit 12 to divide by eleven, an external "decelerate" control-signal is applied to counter 26, so that it acts as a Mod-6 counter; producing an output for the sixth trigger-signal. Removal of the external Mod-6 control-signal causes counter 26 to resume its normal Mod-5 operation, and to produce an output for the fifth trigger-signal. As discussed above, these two outputs are applied to Mod-2 counter 24, which produces an output for every two inputs, and—in this case—produces an output for the eleventh trigger-signal. Thus, the decelerate Mod-6 control-signal causes the combination to act as a divide-by-eleven counter, so that the operation of clock-pulse generator 14 is decelerated.

In the first Mod-4 case, the accelerate control-signal has a duration of four trigger-signals, or is in synchronism with the fourth trigger-signal; and in the second Mod-6 case, the decelerate control-signal has a duration of six trigger-signals, or is in synchronism with the sixth trigger-signal. Thus, by using suitable control-signals to modify the feedback connections, dividing-circuit 12 normally divides by ten; but may be caused to divide by nine, or by eleven. In this way, an external signal source changes the divisor of variable dividing circuit 12, and causes the clock-pulse generator and the timing-pulse generator to be accelerated or decelerated as desired.

The operation and feedback-network modification of the dividing circuits may be understood with the aid of FIGURE 2. Here FIGURE 2*a* indicates the successive states of a scale-of-sixteen counter that comprises four flip-flop binary-circuits identified by the designations $2^4$, $2^2$, $2^1$, and $2^0$; the left column indicating the count—not the value, and the four subsequent columns indicating the states of the various flip-flops for each of the sixteen counts. As is well known, a counter of this type has shifting input signals that cause the various flip-flop circuits of the counter to step progressively through the counter's sixteen different states; and to then reset itself, this counting operating being repetitive. In the illustrated scale-of-sixteen case, resetting normally occurs at the sixteenth count (when the counter is in its one-one-one-one state), and sets the counter to its first zero-zero-zero-zero state. Thus, the counter resets itself at every sixteenth count; and if an output is obtained at this time, the output occurs at one-sixteenth the rate of the shifting input signals—providing a "scale-of-sixteen" counter, or a "divide-by-sixteen" circuit.

When it is desired to change the scale-of-sixteen counter to a scale-of-ten counter, the states of the flip-flops at the tenth count are modified as indicated by the arrows of FIGURE 2*a*. As a general rule it may be stated that if it is desired to reduce the divisor, at a given count a feedback network converts the counter to its one-one-one-one state, so that the next input shifting signal will reset the counter to its zero-zero-zero-zero state. Therefore, in the case illustrated in FIGURE 2*a*, at the tenth count a feedback signal from the first flip-flop is fed to the second and third flip-flops, to convert them from zero-states to their one-states. As a result of this feedback, all of the flip-flops are now in their one-state, so that the counter is in its one-one-one-one state—which is the same as the normal sixteenth count. Therefore, at the next input shifting signal the counter reverts to the zero-zero-zero-zero state; thus by passing counts eleven, twelve, thirteen, fourteen, fifteen, and sixteen. In this way, the counter has been converted from a scale-of-sixteen counter to a scale-of-ten counter, thus producing a divide-by-ten circuit.

FIGURE 2*b* shows a table wherein a three-flip-flop scale-of-eight counter is converted to a scale-of-five counter. As discussed previously, the first column indicates the count, and the next three columns indicate the state of the $2^2$, $2^1$, and $2^0$ flip-flops. In order to cause this normally divide-by-eight counter to divide by five, the various flip-flops have the feedback connections indicated by the arrows, so that at the fifth count the output from the first flip-flop causes the other two flip-flops to flip to their one-states. At this time, all of the flip-flops are in their one-states, so that the counter is in its one-one-one state. The next input signal causes the counter to revert to its zero-zero-zero state—thus bypassing counts six, seven, and eight. In this way, the scale-of-eight counter is converted to a scale-of-five counter.

FIGURE 2*c* shows a table for converting a scale-of-eight counter to a scale-of-four counter. In this case, the feedback connections indicated by the arrows cause the last two flip-flops to convert the first flip-flop to a one-state at the fourth count. As discussed previously, all of the flip-flops are therefore at their one-state at the fourth count; and the next input signal converts the counter to its zero-zero-zero state—thus bypassing counts five through eight. In this way, the scale-of-eight counter can be caused to divide by four.

FIGURE 2*d* shows a table that illustrates how a scale-of-eight counter can be made to divide by six. In this table, the feedback connections indicated by the arrows are such that at the sixth count the outer flip-flops convert the center flip-flop to its one-state—whereupon the counter is in its one-one-one state; and the next input signal causes it to revert to its zero-zero-zero state—thus bypassing counts seven and eight. In this way, the scale-of-eight counter is caused to divide by six.

As shown by the above discussion, a scale-of-eight counter can be caused to divide by four, five, six, or by any other desired divisor that is smaller than nine.

Circuitry for converting a scale-of-eight counter to a scale-of-four, a scale-of-five, and a scale-of-six counter is shown in FIGURE 3; which shows a scale-of-eight counter comprising three flip-flop circuits 30, 32, and 34. These are indicated schematically to have a one-state and a zero-state; and input signals applied to an input shifting-signal terminal **36*a* causes a first $2^0$ flip-flop 30 to repeatedly change its state. When flip-flop 30 shifts from its one state to its zero-state, well-known (and therefore unillustrated) circuitry causes an output from the zero portion of flip-flop 30 to be applied to the shift signal terminal 36*b* of the second flip-flop 32, causing flip-flop circuit 32 to flip. When flip-flop 32 shifts to its second state, well-known (and therefore unillustrated) circuitry causes an output from its zero portion to be applied to shift terminal 36*c* of flip-flop circuit 34**, causing it to flip. As is known to those skilled in the art, the next input shifting signal causes the counter to be set to its first zero-zero-zero state, so that the operation is repetitive.

Flip-flops 30, 32, and 34 also have input terminals known as "preset" and "reset." When an input is applied to the flip-flop's preset terminal, the flip-flop is set to its one-state; whereas when a signal is applied to the flip-flop's reset terminal, the flip-flop is set to its zero-state.

With the above discussion in mind, it will be seen that FIGURE 3*a* shows a three-flip-flop scale-of-eight counter; this counter having a feedback network that converts the normal scale-of-eight counter into a scale-of-five counter. Specifically it has a feedback network from the one-portion of flip-flop 34 to the preset terminals of flip-flops 32 and 30; the feedback network of FIGURE 3*a* corresponding to the indicated feedback shown for count five of FIGURE 2*b*. Therefore, at count five, all of the flip-flops of FIGURE 3*a* will be flipped to their one-states, and the inherent operation of the counter is such that the next input signal applied to shift signal terminal **36*a*** will cause the counter to revert to its zero-zero-zero state. In this way, the schematic circuit of FIGURE 3*a* will convert a scale-of-eight counter to a scale-of-five counter, in the same manner as discussed in connection with the table of FIGURE 2*b*.

Referring now to FIGURE 3*b*, it will be seen that this is a scale-of-eight counter having feedback connections from flip-flops 30 and 32 to an AND circuit 38 whose output is applied to the preset terminal of flip-flop 34; this feedback connection corresponding to the arrows of FIGURE 2*c*. In operation, when flip-flops 30 and 32 are simultaneously in their one-states, their output signals "enable" AND circuit 38 to produce a signal that is applied to the preset input terminal of flip-flop circuit 34. As explained in connection with FIGURE 2*c*, this condition occurs at the fourth count, and resets counter 30 so that the next input signal applied to shift signal terminal **36*a*** causes the counter to revert to its zero-zero-zero state. In this way, the schematic circuit of FIGURE 3*b* converts a scale-of-eight counter to a scale-of-four counter, as discussed in connection with FIGURE 2*c*.

FIGURE 3*c* shows a schematic representation of a scale-of-eight counter that is converted to a scale-of-six counter. As shown, a feedback connection (corresponding to the arrows of FIGURE 2*d*) feeds the output from flip-flop circuits 30 and 34 through an AND circuit 40 to the preset input terminal of flip-flop 32. As discussed in connection with FIGURE 2*d*, this condition occurs at the sixth count, and therefore at this time all of the flip-flops circuits are set to their one state; whereupon the next shifting signal applied to shift terminal **36*a*** causes the counter to revert to its zero-zero-zero state. In this way, the schematic diagram of FIGURE 3*c* shows a state-of-eight counter converted to a divide-by-six circuit.

FIGURE 3 has shown how devide-by-eight counters may be converted to divide by four, by five, or by six; and FIGURE 4 shows how a single divide-by-eight counter may be provided with a suitable feedback network so that it is capable of dividing by four, by five, or by six. The feedback connections are substantially the same as previously showwn in FIGURE 3, except that an additional AND and OR circuit has been introduced, and the original AND circuits have been modified to accept a control signal, which will be discussed subsequently.

For example, referring back to FIGURE 3*c*, it has been explained that at the sixth count, outputs are obtained from flip-flop circuits 30 and 34, and are applied through AND circuit 40 to flip-flop 32. Howwever, as indicated previously, the divide-by-four operation is to be initiated only at desired times, as indicated by the presence of an external control signal; and therefore, in FIGURE 4, AND circuit **40*a* is a three-input circuit that requires an enabling-signal (a Mod-6 activation-signal) to become operative—the output of AND circuit 40*a* being applied to flip-flop 32 through an OR circuit 44**, whose function will be discussed later.

In a similar way, FIGURE 4 shows that signals are applied from flip-flop circuits 30 and 32 through an AND gate **38*a* to flip-flop 34; AND circuit 38*a* also requiring an enabling-signal (a Mod-4** activation signal in this case) in order to become operative.

Similarly, in FIGURE 4, and AND circuit **42*a* has been introduced into the feedback path between flip-flop 34 and flip-flops 30 and 32; AND circuit 42*a* also requiring an enabling-signal, a Mod-5 activation signal in this case—the output of AND circuit 42*a* being applied to flip-flop 32 through OR circuit 44, which therefore flips circuit 32 in response to signals from AND circuit 40*a* or from AND circuit 42*a***.

Thus, in accordance with the previous discussions, the normally divide-by-eight counter of FIGURE 4 will divide by four, by five, or by six, only when suitable activation signals are provided.

The enabling-signals may be obtained in a number of different ways, FIGURE 4 showing a flip-flop 50 that is activated by the output of a three-input AND circuit 52; circuit 52 being energized only when the counter is in its one-one-one state—which is the end of the counter's cycle. When AND circuit 52 produces an output signal, it causes flip-flop 50 to change its state; and in its one-state, flip-flop 50 produces an output signal that is applied to a Mod-4 AND circuit 54 and to a Mod-6 AND circuit 56. In its zero-state, flip-flop 50 produces an output signal that is applied to Mod-5 AND circuit **42*a***.

The circuit of FIGURE 4 operates as follows. Assume that a Mod-5 operation is desired. An external Mod-5 control-signal is applied to the reset terminal of flip-flop 50, causing it to flip to its zero-state. At this time, a Mod-5 activation-signal is provided by the zero-portion of flip-flop 50, and is applied as an enabling-signal to Mod-5 AND circuit 42*a*, which—as explained before—causes the counter to divide by five. Mod-4 circuit of 38*a* and Mod-6 circuit 40*a* are not energized at this time, so that their feedback circuits are inoperative; and therefore, as long as the Mod-5 control-signal is present, the circuit operates as a Mod-5 divider.

When the circuit of FIGURE 4 is to operate as a Mod-4 unit, a Mod-4 control signal is applied to AND circuit 54. The first time that flip-flops 30, 32, and 34 achieve their one-states, AND circuit 52 produces an output signal that causes flip-flop 50 to flip to its one-state, its output signal being applied to AND circuits 54 and 56. Since no Mod-6 signal is applied to AND circuit 56, this AND circuit is disabled. However, a Mod-4 control-signal is being applied to AND circuit 54, so this circuit sees a Mod-4 control-signal and a signal from flip-flop 50. It therefore produces a Mod-4 activation-signal that enables Mod-4 circuit 38*a*, and completes the feedback circuit to produce division by four. In this way, the Mod-8 circuit is converted to a divide-by-four circuit, and divides by four as previously described. When all of the flip-flops 30, 32, and 34 again reach their one-state, AND circuit 52 produces an output signal that flips flip-flop 50 to its zero-state, whereupon it produces a Mod-5 activation-signal that now causes the circuit to divide by five. In this way, the circuit of FIGURE 4—under the influence of a Mod-4 control-signal—divides by four and then divides by five, to produce a Mod-9 operation; and this Mod-4 Mod-5 sequence is cyclically continued as long as the Mod-4 control signal is present.

In order to produce division by eleven, a Mod-6 control-signal is applied, and when flip-flop 50 is in its one-state, the circuit divides by six in the same manner as previously explained for division by four. On the occurrence of the one-one-one state, AND circuit 52 produces a shift signal that causes flip-flop 50 to flip to its zero-state, whereupon it produces a Mod-5 activation-signal that causes the circuit to divide by five. In this way, the circuit has divided by six, and has divided by five, to produce division by eleven. This sequence of cycles will continue until the Mod-6 control-signal is removed.

Therefore, the circuit of FIGURE 4 will divide by various divisors, depending upon the control-signals applied thereto; and under the influence of these control-signals, will cause the dividing circuit 12 of FIGURE 1 to divide by nine, by ten, or by eleven in the manner previously discussed.

It is pointed out in the above-referenced copending patent application, that at various times a coarse-synchronization circuit 18 and a word-synchronization circuit 22 are used to grossly accelerate the operation of the clock-pulse generator 14 of FIGURE 1. Referring again to FIGURE 1, this gross acceleration is accomplished as follows. The coarse-synchronization circuit 18 and the word-synchronization circuit 22 are capable of applying coarse-synchronization "accelerate"-signals, and word-synchronization "accelerate"-signals respectively to an OR circuit 60, whose output is applied to—and enables—an AND circuit 62. Under this condition, the now-enabled AND circuit 62 accepts the output of the normally-operating Mod-5 counter 26, and applied this output through an OR circuit 64 to clock-pulse generator 14. This operation has the effect of by-passing the Mod-2 counter 24; i.e., causing dividing-circuit 12 to divide by five, rather than to divide by ten. Therefore, clock-pulse generator 14 receives signals at double its normal rate signals; but since these received signals are simultaneous, and therefore drives the subsequent circuitry at twice their normal rates. The duration of this double-rate interval is controlled by the duration of the control-signal applied to OR circuit 60.

It will be noted that under this double-rate condition, OR circuit 64 receives—through circuit 26 and AND circuit 62—an input signal for every fifth, tenth, fifteenth, twentieth, etc. trigger-signals; and also receives an input signal—through circuit 26 and circuit 24—an input signal for every tenth, twentieth, thirtieth, etc. trigger signal. Therefore, at every tenth, twentieth, thirtieth, etc. trigger-signal, OR circuit 64 receives two simultaneous, OR circuit 64 applies a single signal to clock-pulse generator 14—which is therefore driven at its double-rate, as discussed above.

In this way, in the expository example, a normally divide-by-ten circuit is caused to divide by five, by nine, by ten, or by eleven; and—by the use of suitable control signals—may be caused to divide by fifteen (Mod-4 plus Mod-5 plus Mod-6 mode of operation) as well as by multiples of these divisors.

Other dividing factors are readily available by suitable design of the binary chain and the feedback circuits. For example, if circuit 26 were designed as a M-2 Mod-3 Mod-4 unit, division by two, three, four, five, six, seven, eight, nine, ten, and multiples thereof may be achieved. Moreover the sequence does not necessary have to use numerically-adjacent numbers as divisors; so that the sequence may use the dividing-factor three, five, eight; four, seven, thirteen; or any other desired set of divisor sequences. Therefore dividing-circuit 26 may be designated as a Mod-X Mod-Y Mod-Z circuit, wherein X, Y, and Z assume any desired values.

It is therefore apparent that the disclosed circuitry obviates the need for standby dividing circuits; and is therefore more efficient, more compact, and more reliable.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:

1. A variable-factor dividing circuit comprising:

a counter having a plurality of bistable devices interconnected to provide said counter with a first dividing-factor;

means, comprising an internal modifiable feedback network, interconnecting preselected ones of said bistable devices of said counter, for providing said counter with at least a second dividing-factor; and binary logic switch means for modifying said feedback-network which enables and disables portions of said feedback-network to control the interconnections between said preselected bistable devices of said counter for predetermined sequences of cycles of said dividing-circuit for changing the dividing-factor of said counter between said dividing-factors.

2. The circuit of claim 1 wherein said feedback network comprises an AND circuit having an input from at least one of said devices, at least one output of said AND circuit being applied to at least another of said devices, and an enabling input;

said means for enabling and disabling comprising a second AND circuit having inputs from a group of said devices whose states collectively indicate the end of a circuit cycle, a bistable control device having a state-changing input from said second AND circuit, a third AND circuit having a first input from said bistable control device and a second input in the form of a control signal—whereby the output from said third AND circuit is said enabling input signal, and upon occurrence of said control signal the dividing-circuit will operate in sequences of cycles, alternatively dividing by said first and second dividing-factors.

3. A variable-factor dividing circuit comprising:

a plurality of bistate devices interconnected to provide a first dividing-factor;

a feedback network interconnecting preselected ones of said bistate devices to provide a second dividing-factor, said feedback network comprising an AND circuit having an input from at least one of said devices, at least one output of said AND circuit being applied to at least another of said devices, and an enabling input;

means for enabling and disabling said feedback-network for predetermined sequences of cycles of said dividing-circuit, said means for enabling and disabling comprising a second AND circuit having inputs from a group of said devices whose states collectively indicate the end of a circuit cycle, a bistate control device having a state-changing input from said second AND circuit, a third AND circuit having a first input from said bistate control device and a second input in the form of a control signal—whereby the output from said third AND circuit is said enabling input signal, and upon occurrence of said control signal the dividing-circuit will operate in sequences of cycles, alternatively dividing by said first and second dividing-factors;

a second feedback network interconnecting preselected ones of said bistate devices to provide a third dividing-factor, said second feedback network comprising a fourth AND circuit having an input from at least one of said devices, at least one output of said fourth AND circuit being applied to at least another of said devices, and second means for enabling and disabling said second feedback network, said second means for enabling and disabling comprising a fifth AND circuit having a first input from said bistate control device and a second input in the form of a second control signal—whereby the output from said fifth AND circuit is an enabling input signal, and upon occurrence of said second control signal the dividing circuit will operate in sequences of cycles, alternatively dividing by said first and third dividing factors.

4. The combination comprising:

a dividing circuit providing a normal dividing-factor, said normal dividing-factor being established by a feedback network in said dividing circuit;

means for applying a first control-signal to said dividing circuit to cause said dividing circuit to provide a second dividing-factor, said change in dividing factor being accomplished by modifying said feedback network;

means for applying a second control-signal to said dividing circuit to cause said dividing circuit to provide a third dividing-factor, said change in dividing-factor beng accomplished by modifying said feedback network—for causing said input-signal frequency to be divided by said normal dividing-factor, by said second dividing-factor, or by said third dividing-factor in accordance with the applied control-signal.

5. The combination of claim 4 including means for causing said variable dividing circuit to divide said input-signals by one of said dividing-factors for a predetermined interval of time, and to then produce a first output signal;

means for causing said variable dividing-circuit to divide said input-signals by another of said dividing-factors for a predetermined interval, and to then produce a second output signal.

6. The combination of claim 5 including a second dividing circuit;

means for applying said first output signal to said second dividing circuit;

means for applying said second output-signal to said second dividing circuit.

7. A variable dividing circuit comprising:

a first, normally Mod-X, electronic dividing circuit, the Mod-X mode of operation being established by a variable feedback network, said variable feedback network being modifiable to produce a Mod-Y mode of operation and a Mod-Z mode of operation, said first dividing circuit having an input-signal terminal, a first-control-signal terminal, a second-control-signal terminal, and an output-signal terminal;

means for producing a first control-signal;

means for applying said first control-signal to said first control-signal terminal for modifying said feedback network to produce a Mod-Y mode of operation for a predetermined interval, and to then produce an output-signal;

means for producing a second control-signal;

means for applying said second control-signal to said second control-signal terminal for modifying said feedback network to produce a Mod-Z mode of operation for a predetermined interval, and to then produce an output-signal;

a second, Mod-2, dividing circuit having an inpu t-terminal and an output terminal;

means for applying said output-signals from said output-terminal of said first dividing circuit to the input-terminal of said second dividing circuit;

means for producing a third control-signal;

an AND circuit having two inputs and an output;

means for applying the output-signal from said output-terminal of said first dividing circuit to one input of said AND circuit;

means for applying said third control-signal to said other input of said AND circuit;

an OR circuit having two inputs and an output;

means for applying the output of said second dividing circuit to one input of said OR circuit;

means for applying the output of said AND circuit to the other input of said OR circuit;

whereby the output of said OR circuit may be applied to a utilization device.

References Cited

UNITED STATES PATENTS

| | | | |
|---|---|---|---|
| 2,697,549 | 12/1954 | Hobbs | 328—46 |
| 2,806,947 | 9/1957 | Macknight | 328—46 X |
| 3,023,373 | 2/1962 | Naylor | 328—46 X |
| 3,287,648 | 11/1966 | Poole | 328—48 |
| 3,375,448 | 3/1968 | Newman et al. | 328—42 |
| 3,375,449 | 3/1968 | Ribour et al. | 328—48 |
| 3,409,761 | 11/1968 | Becker | 328—46 X |

JOHN S. HEYMAN, Primary Examiner

U.S. Cl. X.R.

328—42, 48

PO-1050
(5/69)

UNITED STATES PATENT OFFICE
CERTIFICATE OF CORRECTION

Patent No. 3,484,699 Dated Dec.16, 1969

Inventor(s) Jack D. Israel

It is certified that error appears in the above-identified patent and that said Letters Patent are hereby corrected as shown below:

In Column 6, line 24, "devide" should be --divide--.

In Column 7, lines 73 and 74, remove "signals; but since these received signals are simultaneous".

In Column 8, after "simultaneous," in line 11 and before "OR" in line 12, insert --signals; but since these received signals are simultaneous,--.

NOTE: The above insertion into Column 8 was requested by our amendment A mailed October 11,1968 (received by your office Oct.14, 1968) but was inserted in error into Column 7.

SIGNED AND
SEALED
JUN 23 1970

(SEAL)
Attest:

Edward M. Fletcher, Jr.
Attesting Officer

WILLIAM E. SCHUYLER, JR.
Commissioner of Patents